United States Patent [19]

Fossum

[11] Patent Number: 4,943,260
[45] Date of Patent: Jul. 24, 1990

[54] WEED SEED HARVESTER

[76] Inventor: Arthur J. Fossum, 1034 N. 15th St., Fargo, N. Dak. 58102

[21] Appl. No.: 253,848

[22] Filed: Oct. 5, 1988

[51] Int. Cl.$^5$ .......................... A01F 12/44; B07B 1/30
[52] U.S. Cl. ..................................... 460/96; 209/241; 209/257; 460/102
[58] Field of Search .................. 56/126; 130/24, 27 B, 130/27 R, 27 Z, DIG. 6; 460/90, 93, 94, 111, 96, 102; 209/240, 241, 257, 317, 348

[56] References Cited

U.S. PATENT DOCUMENTS

| | | | |
|---|---|---|---|
| 1,868,237 | 7/1932 | Judson | 209/7 |
| 2,609,929 | 9/1952 | King | 209/136 |
| 2,617,425 | 11/1952 | Dion | 130/27 Z X |
| 2,633,851 | 4/1953 | Boyer | 130/27 R |
| 3,138,185 | 6/1964 | Frederick | 146/107 |
| 3,487,926 | 1/1970 | Brister | 209/348 |
| 3,580,257 | 5/1971 | Teague | 130/24 |
| 4,188,160 | 2/1980 | Corbett et al. | 406/58 |
| 4,256,572 | 3/1981 | Read | 209/257 |
| 4,324,093 | 4/1982 | van der Lely et al. | 56/377 |

Primary Examiner—Jerome W. Massie, IV
Assistant Examiner—David J. Bagnell
Attorney, Agent, or Firm—Kinney & Lange

[57] ABSTRACT

A mobile collector or harvester for weed seeds that are normally discharged onto the ground during a combining operation, is connected to trail a conventional grain combine, and collects the straw and the tailings discharged from the separating sieve that normally discharges small chaff and seeds onto the ground. The harvester frame has a conveyor for conveying straw and chaff onto a separate shaker screening member, which is of size to let the small weed seeds drop onto a grain pan and then into a hopper, while the straw is retained on the top of the screen and discharged onto the ground. A separate auger conveyor is used for elevating the weed seeds from the hopper into a storage tank, which is then periodically emptied through the use of another auger conveyor. The entire unit is self-contained including an internal combustion engine power unit, that drives a hydraulic pump for operating hydraulic motors through suitable valves. The apparatus as shown has its forward end connected directly to the combine, and caster wheels at the rear so that it will trail properly and will turn easily. Other forms of support also can be used.

11 Claims, 4 Drawing Sheets

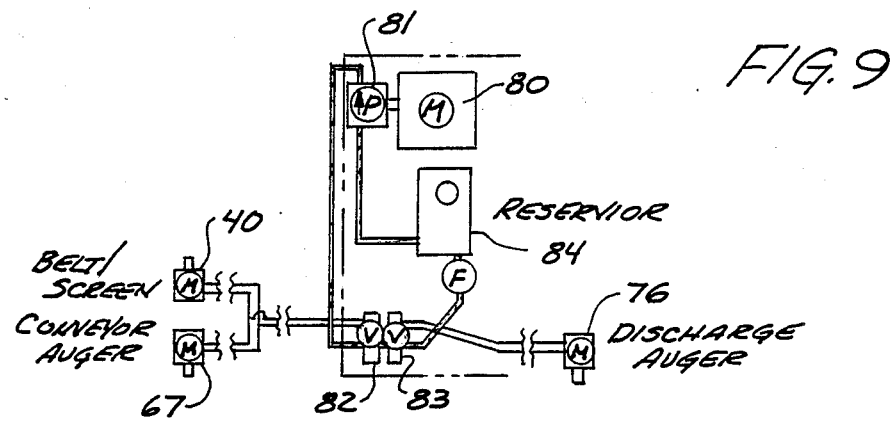
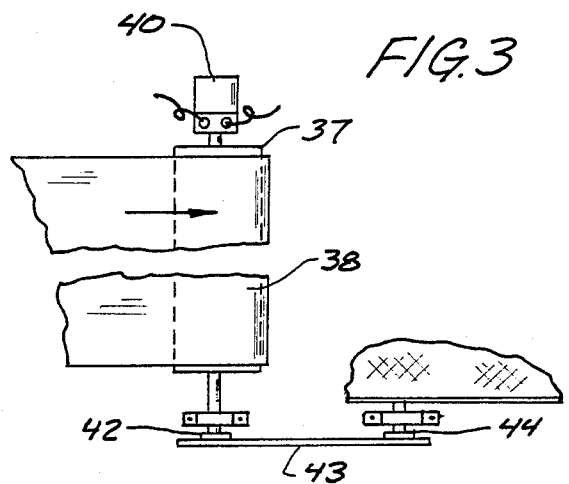
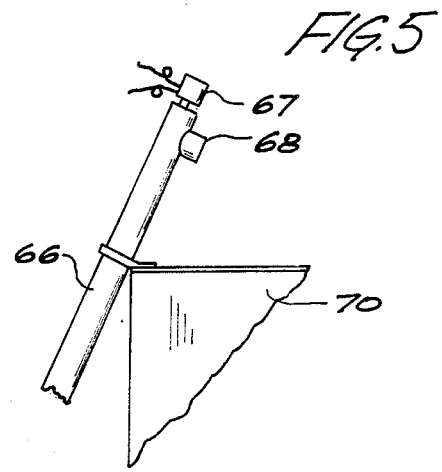
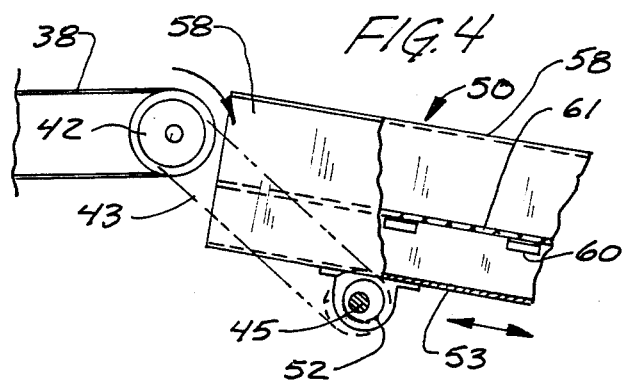
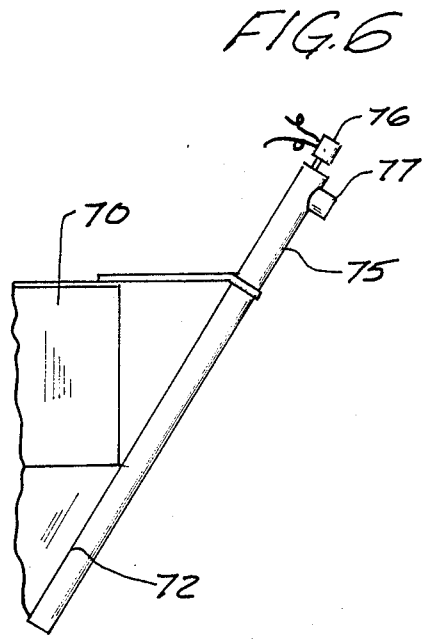

FIG. 7
FIG. 8
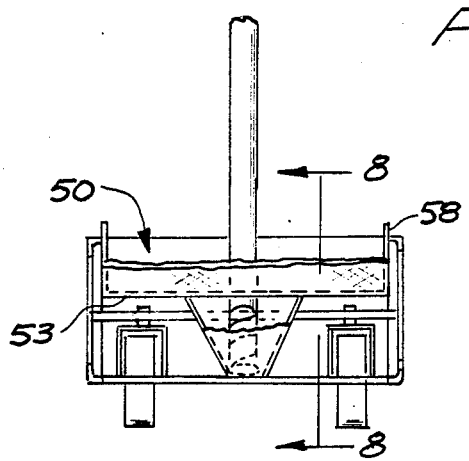
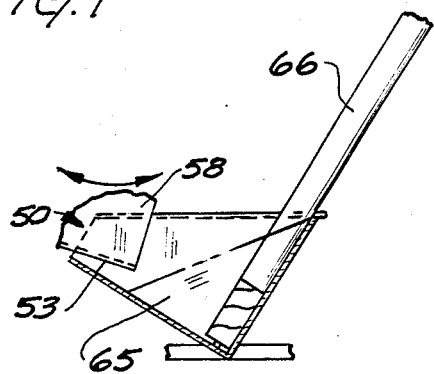

WEED SEED HARVESTER

BACKGROUND OF THE INVENTION

1. Field of the Invention

The present invention relates to a collectors or harvesters for collecting weed seeds that normally would be discharged onto the ground.

2. Description of the Prior Art

Grain fields generally have a stand of various types of weeds, including materials such as wild oats, mustard and other noxious weeds which essentially are harvested along with the grain. The smaller weed seeds are separated from the grain during combining and are discharged back onto the ground, so that they will cause a problem in the next year. This problem has been recognized and ways of controlling the growth of weeds have been advanced, such as using chemicals that prevent seed germination or kill the weeds. Such chemicals tend to pollute the ground. In the prior art, some attempts have been made for collecting weed seeds or feed residues, including various attachments that are connected directly to combines. For example, U.S. Pat. No. 3,580,257 shows a weed seed collector for a thresher combine, that comprises a cross auger for collecting the residues from the chaff sieve of the combine and depositing the seeds into a separate tank where they are stored until they are either dumped or otherwise disposed of. The device shown in Patent '257 has a diverter so that material which normally would be discharged into a storage tank can be diverted to the combine straw walkers again, if there are no substantial amount of weed seeds present.

A trailing device for reclaiming seeds from a combine is shown in U.S. Pat. No. 3,487,926. A device utilizes a vibrating screen in a trailer that merely stores the products that fall through the screen in the bottom of the trailer, with no easy way of removing the materials. The unit is designed solely to collect straw that would be discharged out the rear of the trailer. A shaker screen, however, which is used with the present invention, is also shown in this device.

A straw conserving apparatus is shown in U.S. Pat. No. 3,138,185 and this is a trailer that trails behind the combine and stores the straw so that it can be removed from the field.

A feed residue saver for combines is shown in U.S. Pat. No. 4,188,160 and is for saving feed residues that ordinarily would be dropped on the ground. It utilizes an auger for directing material into a blower which then blows the material into a wagon or trailer behind the combine.

U.S. Pat. No. 2,609,929 relates to a grain and weed seed reclaiming accessory that provides a trough at the back end of a combine sieve and the material then slides down into a blower which discharges it into a storage wagon.

U.S. Pat. No. 1,868,237 shows a grain cleaning and loading apparatus that is a trailer type vehicle for connection behind a grain combine.

However, the prior art lacks a self-contained unit that will separate out and store a substantial amount of weed seed, and will discharge the straw back onto the ground so organic materials are being returned back to the soil.

SUMMARY OF THE INVENTION

The present invention relates to a weed seed harvester that is mounted at the rear end of a grain combine, and collects the "tailings" from the grain separating sieve of a combine and also collects the straw that comes off the straw walker, and which has a screening member for separating out seeds from the straw. The screening member is a shaker screen of substantially conventional design that has a bottom pan that collects the seeds while the straw moves rearwardly over the screen and is discharged back onto the ground. The seeds are collected in a small hopper, and then elevated on a continuous basis into a storage tank that is on the self-contained weed seed harvester frame. The storage tank is then periodically emptied of the weed seeds into a trailer or truck.

The weed seed harvester may include a conveyor belt that receives the materials from the combine and conveys them rearwardly sufficiently far so that the screening action is clear of the combine itself. An adequate amount of screen area is provided in a relatively compact space and the screen member can be used without the conveyor. The weed seed harvester is all hydraulically powered, through suitable hydraulic motors, and the controls are simple to operate and can be remotely operated if desired. The frame for the weed seed harvester has caster wheels on it to permit it to be easily mounted and to follow the movement of the combine closely.

The amount of weight that is supported by the combine is relatively low, so that direct attachment to the combine frame is easily accommodated.

The seeds that are collected are thus removed from the ground so they will not grow in the next season, and this eliminates the need for using large amounts of chemicals for controlling weeds, and enhances the environmental aspects of harvesting.

BRIEF DESCRIPTION OF THE DRAWINGS

FIG. 3 is a fragmentary top plan view of a conveyor end, and the screening pan combination;

FIG. 4 is a fragmentary side view of the device of FIG. 3;

FIG. 5 is a fragmentary side elevational view of the top end of an elevating auger;

FIG. 6 is a fragmentary front view of the tank discharge auger of the present invention;

FIG. 7 is a fragmentary view taken along line 7—7 in FIG. 1;

FIG. 8 is a fragmentary side view of the elevating auger taken as on line 8—8 in FIG. 7; and FIG. 9 is a schematic representation of a hydraulic current used for drawing various components.

DETAILED DESCRIPTION OF THE PREFERRED EMBODIMENTS

Figure 1:
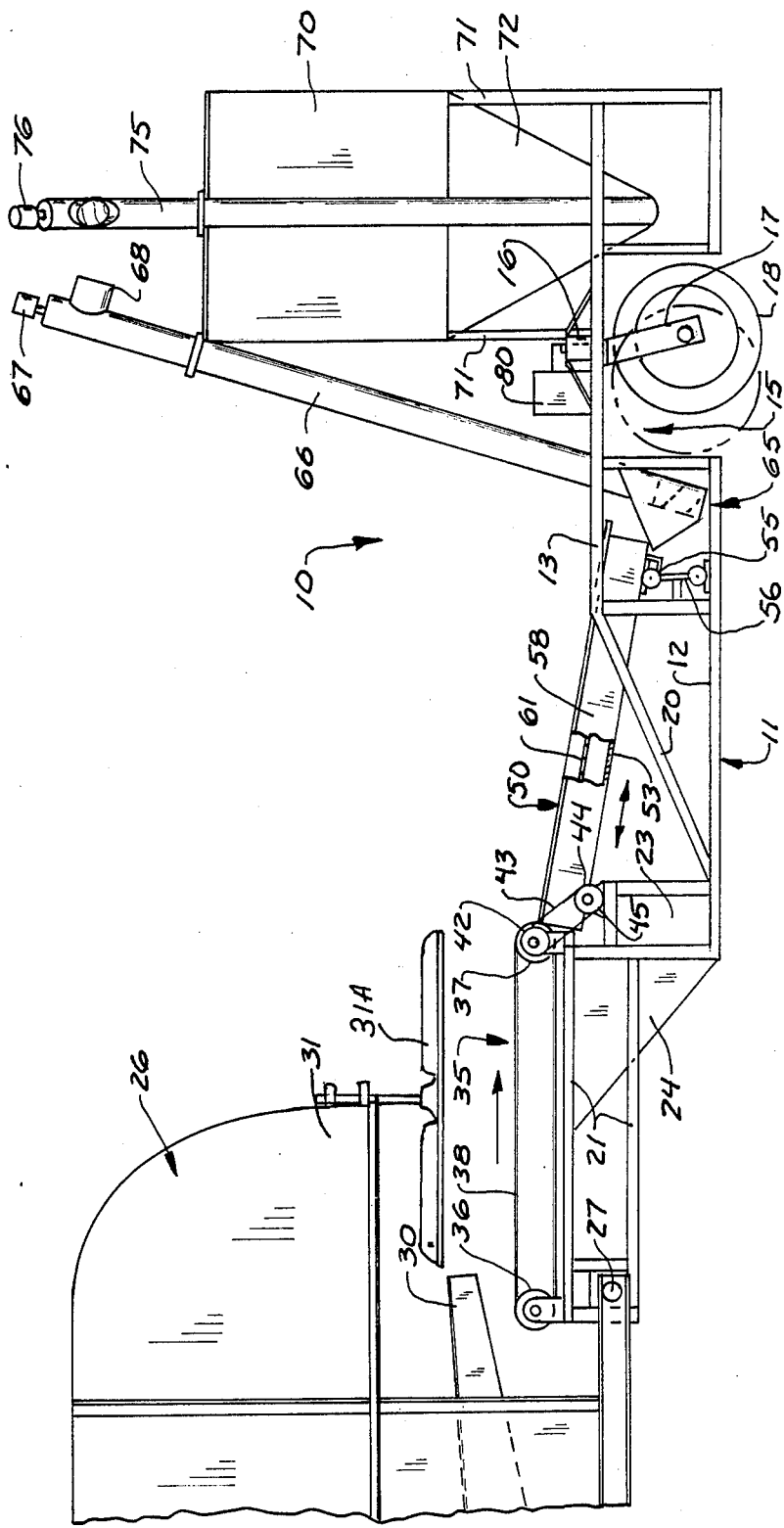
FIG. 1 is a side elevational view of a weed seed harvester made according to the present invention.

A weed seed harvester illustrated generally at 10 includes a main frame assembly 11, which is made up in a suitable manner and includes lower rail members 12 that extend on opposite sides of the frame, and a set of upper rear rail members 13 that are used toward the rear of the frame 11. The rail members 13 are used for supporting and bracing a pair of wheel well frames 15. A hub 16 is attached to the upper rail member 13 on each side of the frame adjacent the wheel well frames, and this hub is used for mounting a caster wheel assembly 17, which has a caster wheel 18 therein for rotatably mounting and supporting the rear end of the frame assembly 11.

The rear upper rail 13 is connected to the forward end of the machine through braces 20, and there are upper rail members 21 at the forward end of the machine, which are also braced back to a bearing support frame 23 with a suitable gusset 24 to provide adequate support at the front end of the machine. The rails 21 at the front end of the machine, which can be joined together with suitable gusset members are used for attaching the frame to a combine frame illustrated schematically at 26 through the use of a suitable connecting pin 27. The frame assembly is made so that it is below a tailing sieve 30, and below a straw hood 31 of the combine. The sieve and straw hood are formed in a conventional manner on a conventional combine. Also, a straw spreader fan 31A is schematically shown. This spreads the majority of the straw so most of the straw does not land on the weed seed harvester.

The frame assembly 11 is connected on both sides of the frame to the combine, so that the caster wheels 18 (one on each side of frame 11) will caster and the frame will trail the combine very closely.

Figure 2:
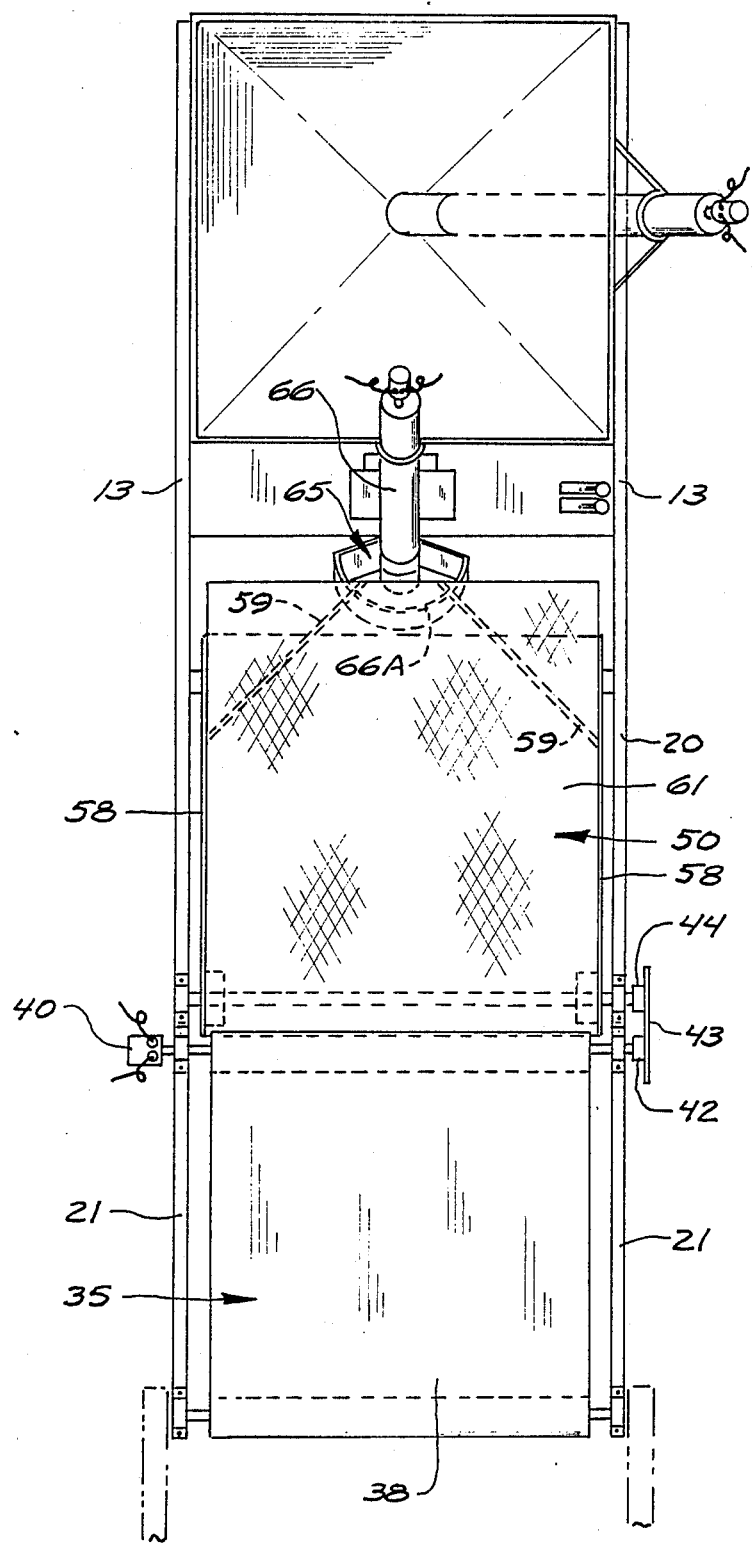
FIG. 2 is a top plan view thereof, with parts in section and parts broken away.

The upper rail members 21 at the front of the machine in turn have members used, if desired, to support a belt type conveyor 35, which comprises a pair of rollers 36 and 37 which are mounted on shafts that are supported on suitable bearings on the upper one of the front rail members 21. The rollers 36 and 37 support a belt 38 that is drivably mounted so its top length or reach moves rearwardly. The belt 38 is driven through the use of a hydraulic motor 40 that drives the rear roller 37. The front roller 36 has a shaft that extends laterally outwardly (FIGS. 2, 3 and 4) and a sprocket 42 is mounted thereon, to drive a chain 43 which in turn drives a sprocket 44. The sprocket 44 is drivably mounted onto a shaft 45 that is supported on the support frame 23 on opposite sides of the machine.

The shaft indicated generally at 45 is used to mount through eccentric bearings 52 of conventional design that are supported on a bottom wall of a shaker screen assembly 50. The shaker screen assembly 50 is similar to that used for other screening members for grain. The eccentric bearings 52 are conventional units that give essentially a back-and-forth motion as the bearings are rotated (and up and down as well). This causes a vibratory action, and as seen in FIG. 4, these bearings 52 are bolted to the bottom wall 53 of the screen assembly 50, to provide for the back-and-forth action. The bearings 52 are at an upper end of this screen, and as can be seen the screen inclines rearwardly and downwardly, and is supported on a suitable sliding support 55 that can be of suitable low friction material, or a spring type support. The supports 55 are supported on suitable upright members 56 back to the frame member 12. Thus, when the chain 43 is driven, the sprocket 44 will rotate the shaft 45 and the eccentric bearings 52 will cause the shaker screen assembly 50 to shake or oscillate back and forth at a desired speed depending on the sprocket ratio and the rate of rotation of the hydraulic motor 40.

The screen assembly 50, in addition to the solid (sheet metal) bottom wall 53, has upright side walls 58, that are spaced apart slightly wider than the width of the conveyor belt 38. The side walls 58 have suitable angle iron supports or other suitable clips shown at 60 thereon, and these clips are used to support a cross screen 61. The screen 61 also can be supported with suitable cross members in a conventional manner, to provide a sufficient stiffness to the screen to carry the weight of material that is dropped thereon from a combine. The screen 61 is selected in size so that any straw and chaff will stay on the top, and seeds, such as weed seeds or grain that might be passed through the combine, are dropped down through the screen 61 onto the bottom wall 53.

At the rear or lower end of the screen assembly 50 near the support 55, the bottom wall 53 has guide rib members 59 below screen 61 that will guide the weed seed in toward the center of the wall, to deposit the seed in a hopper indicated generally at 65 which is below the bottom wall 53 of the screen assembly 50. This hopper 65 is relatively small, and is made so that the lower end of the hopper is forwardly of the rear end of the screen assembly 50 so that any straw being carried on the top of the screen (which was not spread by spreader 31A) will drop over the end of the screen, and between the side frame members and onto the ground. The straw and chaff will actually pass between the caster wheels 18, and be left on the ground as the weed seed harvester moves forwardly.

The small hopper 65 has an elevating auger 66 therein, and suitable baffles 66A are provided so that straw is diverted from the hopper 65, in a normal manner. Baffling can be used as desired, and does not form part of the invention, except to the extent that the hopper 65 forms a receptacle for collecting the weed seed temporarily. The hopper 65A tapers down into a pocket in which the inlet end of the auger conveyor 66 is formed. The lower portion of the hopper 65A thus has a quantity of weed seed in it, and the auger conveyor 66, which has an outer tube and inner auger flighting in a conventional manner, is driven with a hydraulic motor 67 at the upper end, and discharges out through a spout 68 into a hopper or tank 70. The hopper or tank 70 is mounted at the rear of the frame 11, above the upper rails 13, on suitable vertical supports 71. The lower end of the tank is tapered as at 72 at about a 60° angle, to form a hopper bottom in a known manner into which a second auger conveyor 75 is open. This second auger conveyor 75 is driven through a hydraulic motor 76 at its upper end, and when the motor is operated, the auger will discharge material out through a spout 77 into a suitable storage tank. The hopper or tank 70 can have a cover over the top if desired, and a tube leading from the outlet spout 68 into the tank 70, or the spout 68 can merely discharge directly under gravity through the open top of the hopper 70.

A suitable internal combustion engine indicated generally at 80 can be mounted on the upper rails 13, along with a suitable hydraulic pump, hydraulic reservoir, and other components. As shown in FIG. 9, the engine indicated at 80 drives a pump 81 in a suitable manner, which provides fluid under pressure to a set of valves 82 and 83, and a reservoir 84 is also provided for return flow. The valve 82 will operate motor 40 and the motor 67 in parallel, so that both the auger conveyor 66 and the conveyor belt 38 and screen 35 are operated simultaneously, and any weed seed being deposited in the hopper 65 is immediately conveyed away. The valve 83 can be used for operating the motor 76 that drives the discharge auger 75 for the tank 70.

When the weed seed harvester or collector is connected to a combine, the front end of the frame 11 is supported on the combine, as stated, and the caster wheels 18 support the heavier components, such as the tank 70 when it starts getting filled with seeds. Thus, the heaviest weight is not supported on the combine at all, but only the forward end of the frame, which mounts the belt conveyor and the shaker screen assembly 50.

When the harvester is running, chaff from the combine sieve 30 and some straw and chaff from hood 31, which was spread by straw spreader 31A, will drop onto the belt 38 and be conveyed to the rear and dropped off onto the top of the screen member 61. The screen will be shaking or oscillating as the vibrating screen assembly 50 is operated, and the weed seeds will drop through the screen 61 onto the bottom wall 53 and then will move back toward the hopper 65, while the chaff and some straw is discharged up over the outer end of the shaker screen assembly 50 and back onto the ground. The conveyer 66 will be running to convey the weed seeds into storage tank 70 for storage and ultimate disposal. The weed seed harvester thus has significant use in collecting weed seeds and protecting the environment, and it is done in a relatively simple, low cost manner. The conveyor belt can be eliminated if desired and the chaff and material from the sieve 30 dropped directly on the shaker screen.

Although the present invention has been described with reference to preferred embodiments, workers skilled in the art will recognize that changes may be made in form and detail without departing from the spirit and scope of the invention.

What is claimed is:

1. Apparatus for collecting weed seeds from the discharge end of a grain combine, comprising:
   a frame;
   wheel means at the rear of the frame to mount said frame for movement along the ground;
   means at a forward portion of said frame for attaching it to be towed by a combine in position trailing such combine;
   means for receiving material from selected discharge points of the combine including a conveyor section adjacent the forward end of the frame for receiving chaff and straw from a combine and conveying it rearwardly and a shaker screening member on the frame rearwardly of the conveyor section that separates the chaff and straw from small seed and particles;
   means to collect said small seed and particles from the shaker screening member and convey them to a storage container; and
   means for permitting discharge of chaff and straw collected by the shaker screening member back onto the ground.

2. The apparatus as specified in claim 1, wherein the shaker screening member comprises a trough having an imperforate bottom wall, and an intermediate screen spaced above the bottom wall, said intermediate screen permitting seeds to be gathered to pass through the screen, while the straw remains on the top of the screen and is discharged to the rear.

3. The apparatus as specified in claim 2, wherein said frame has support wheels spaced rearwardly from the shaker screening member sufficiently to permit straw to drop between the shaker screening member and the wheels.

4. The apparatus as specified in claim 1, wherein said frame has caster wheels at a rear portion thereof, and said means at the forward end of the frame for attaching to a combine includes means for supporting the vertical loads on the forward end of the frame.

5. The apparatus as specified in claim 4 further comprising a storage hopper mounted at the rear portions of the frame closely adjacent the mounting of said caster wheels, and a discharge conveyor selectively operable to remove material from said storage container.

6. The apparatus as specified in claim 1, wherein said means to collect said small seeds and particles and convey them to a desired location comprises a hopper member that gathers the small seeds and particles into a portion of the hopper member, and an auger conveyor for conveying the small seeds and particles from the hopper member into a storage container.

7. The apparatus of claim 6 and means to mount the storage container at the rear portions of the frame.

8. Apparatus for collecting weed seeds from the discharge end of a grain combine that has a discharge of chaff at a rear end thereof, comprising:
   a frame;
   means to mount said frame for movement along the ground;
   means at a forward portion of said frame for attaching it to be towed by a combine in position below rear portions of such combine;
   means for receiving material from selected discharge points of such combine including a generally horizontal conveyor for receiving discharged chaff and conveying it rearwardly, and a shaker screening member that separates the chaff from small seed and particles positioned rearwardly of the conveyor for receiving material from the rear of the conveyor;
   means to collect said small seed and particles from the shaker screening member and convey them to a storage container; and
   means for permitting discharge of chaff collected back onto the ground.

9. The apparatus as specified in claim 8 wherein said conveyor has a generally imperforate surface for receiving chaff discharged from a combine.

10. The apparatus of claim 8, wherein said conveyor is a generally horizontal conveyor having an imperforate surface for receiving chaff discharged from a combine.

11. The apparatus of claim 8, wherein said conveyor is a generally horizontal endless belt type conveyor positioned to receive chaff discharged from a combine.

* * * * *